United States Patent
Krikheli et al.

(10) Patent No.: US 8,166,046 B1
(45) Date of Patent: Apr. 24, 2012

(54) LINK FILTER

(75) Inventors: Jerry P. Krikheli, Sherman Oaks, CA (US); Shuman Ghosemajumder, Palo Alto, CA (US); Jeffery K. Eddings, San Ramon, CA (US)

(73) Assignee: Google Inc., Mountain View, CA (US)

( * ) Notice: Subject to any disclaimer, the term of this patent is extended or adjusted under 35 U.S.C. 154(b) by 329 days.

(21) Appl. No.: 11/853,595

(22) Filed: Sep. 11, 2007

(51) Int. Cl.
*G06F 7/00* (2006.01)

(52) U.S. Cl. ........................................... 707/748

(58) Field of Classification Search .................. 707/101, 707/705, 748
See application file for complete search history.

(56) References Cited

U.S. PATENT DOCUMENTS

| | | | |
|---|---|---|---|
| 5,724,521 A | 3/1998 | Dedrick | |
| 5,740,549 A | 4/1998 | Reilly et al. | |
| 5,848,397 A | 12/1998 | Marsh et al. | |
| 5,948,061 A | 9/1999 | Merriman | |
| 6,026,368 A | 2/2000 | Brown et al. | |
| 6,044,376 A | 3/2000 | Kurtzman, II | |
| 6,078,914 A | 6/2000 | Redfern | |
| 6,122,647 A * | 9/2000 | Horowitz et al. | 715/205 |
| 6,144,944 A | 11/2000 | Kurtzman, II et al. | |
| 6,167,382 A | 12/2000 | Sparks et al. | |
| 6,269,361 B1 | 7/2001 | Davis et al. | |
| 6,285,999 B1 | 9/2001 | Page | |
| 6,401,075 B1 | 6/2002 | Mason et al. | |
| 6,985,882 B1 | 1/2006 | Del Sesto | |
| 7,039,599 B2 | 5/2006 | Merriman | |
| 7,136,875 B2 | 11/2006 | Anderson et al. | |
| 2002/0120505 A1 * | 8/2002 | Henkin et al. | 705/14 |
| 2002/0143827 A1 * | 10/2002 | Crandall | 707/530 |
| 2005/0091111 A1 * | 4/2005 | Green et al. | 705/14 |
| 2007/0192181 A1 * | 8/2007 | Asdourian | 705/14 |

FOREIGN PATENT DOCUMENTS

WO    WO 97/21183    6/1997

OTHER PUBLICATIONS

U.S. Appl. No. 95/001,073, filed Sep. 30, 2004, Reexamination of Stone et al.
U.S. Appl. No. 95/001,061, filed Sep. 3, 2002, Reexamination of Stone et al.
U.S. Appl. No. 95/001,069, filed Jul. 11, 2002, Reexamination of Dean et al.
U.S. Appl. No. 95/001,068, filed Dec. 7, 2002, Reexamination of Stone et al.
AdForce, Inc., A Complete Guide to AdForce, Version 2.6, 1998.
AdForce, Inc., S-1/A SEC Filing, May 6, 1999.
AdKnowledge Campaign Manager: Reviewer's Guide, AdKnowledge, Aug. 1998.
AdKnowledge Market Match Planner: Reviewer's Guide, AdKnowledge, May 1998.
Ad-Star.com website archive from www.Archive.org, Apr. 12, 1997 and Feb. 1, 1997.
Baseview Products, Inc., AdManagerPro Administration Manual v. 2.0, Dec. 1998.

(Continued)

*Primary Examiner* — Jensen Hu
(74) *Attorney, Agent, or Firm* — Fish & Richardson P.C.

(57) ABSTRACT

One or more keywords associated with a first content item are identified. Restricted terms are identified. One or more of the one or more keywords are selected as a link, wherein the link does not contain the restricted terms.

22 Claims, 6 Drawing Sheets

OTHER PUBLICATIONS

Baseview Products, Inc., ClassManagerPro Administration Manual v. 1.0.5, Feb. 1, 1997.

Business Wire, "Global Network, Inc. Enters Into Agreement in Principle With Major Advertising Agency," Oct. 4, 1999.

Information Access Technologies, Inc., Aaddzz brochure, "The Best Way To Buy And Sell Web Advertising Space," © 1997.

Information Access Technologies, Inc., Aaddzz.com website archive from www. Archive.org, archived on Jan. 30, 1998.

Zeff, R. et al., Advertising on the Internet, 2nd Ed., John Wiley & Sons, 1999.

Dedrick, R., Interactive Electronic Advertising, IEEE, 1994.

Dedrick, R., A Consumption Model for Targeted Electronic Advertising, Intel Architecture Labs, IEEE, 1995.

Request for Reexamination of U.S. Patent No. 7,240,025 B2, Control No. 95/001,073.

Request for Reexamination of U.S. Patent No. 6,446,045 B1, Control No. 95/001,061.

Request for Reexamination of U.S. Patent No. 7,249,059 B2, Control No. 95/001,069.

Request for Reexamination of U.S. Patent No. 6,829,587 B2, Control No. 95/001,068.

Brin, S., et al., "The Anatomy of a Large-Scale Hypertextual Web Search Engine", In: Seventh International World-Wide Web Conference (WWW 1998), Apr. 14-18, 1998, Brisbane, Australia, 20 pages.

* cited by examiner

LINK FILTER

BACKGROUND

This disclosure relates to information retrieval.

Interactive media (e.g., the Internet) has great potential for improving the targeting of content items, e.g., advertisements, to receptive audiences. One form of online advertising is ad syndication, which allows advertisers to extend their marketing reach by distributing ads to additional partners. For example, third party online publishers can place an advertiser's text or image ads on the publishers' websites to drive online customers to the advertiser's website. An example of such a system is AdSense™ offered by Google, Inc.

The advertisements that are placed on a publisher's website can be grouped together and listed on a separate associated landing page. A link to the landing page can be placed on the publisher's website to associate the advertisements with the website. Some advertising systems allow publishers to add and remove terms from the link to target their changing product. Other processes can also be used to select the terms used in the link associated with the landing page of the advertisements.

SUMMARY

Disclosed herein are systems and methods of filtering link keywords. In one implementation, at least one keyword associated with a first content item is identified. Restricted terms are also identified. The at least one keyword is selected as a link, wherein the link does not contain the restricted terms.

In another implementation, a first content item is identified, wherein the first content item is associated with at least one keyword. The at least one keyword is selected as a potential link associated with the first content item. Restricted terms are also identified, and the restricted terms are removed from the potential link. The potential link is selected as the actual link associated with the first content item.

In another implementation, a system includes a data store configured to store a first content item and a content engine. The content engine identifies at least one keyword associated with a first content item, identifies restricted terms, and selects the at least one keyword as a link, wherein the link does not contain the restricted terms.

DETAILED DESCRIPTION

Figure 1:
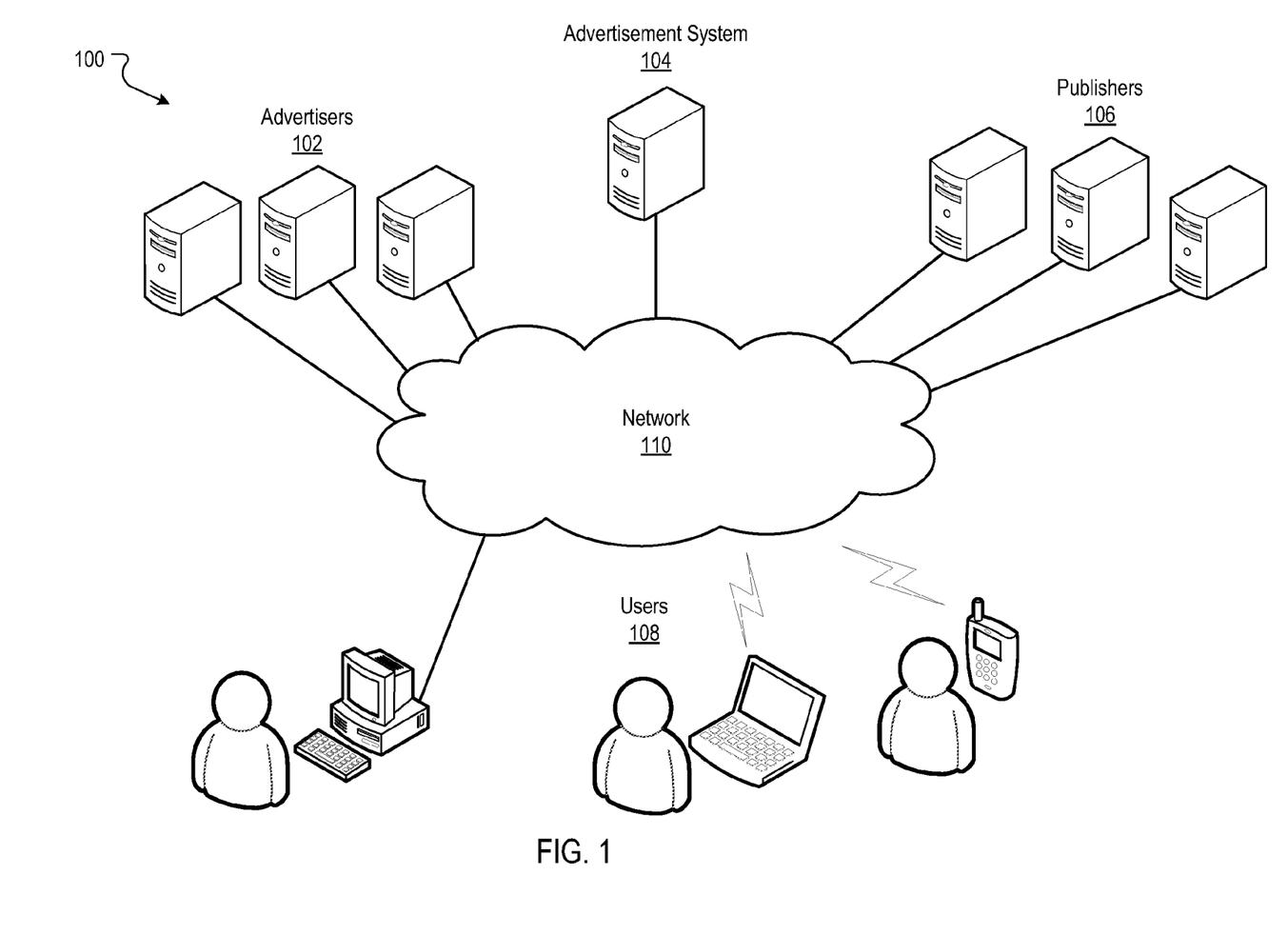
FIG. 1 is a block diagram of an example online advertising system.

FIG. 1 is a block diagram of an example online advertising system 100. A computer network 110, such as a local area network (LAN), wide area network (WAN), the Internet, or a combination thereof, connects the advertisers 102, an advertising system 104, publishers 106, and users 108.

In some implementations, one or more advertisers 102 can directly, or indirectly, enter, maintain, and track advertisement ("ad") information in an advertisement system 104. The advertisements may be in the form of graphical advertisements, such as banner advertisements, text only advertisements, image advertisements, audio advertisements, video advertisements, advertisements combining one of more of any of such components, etc. The advertisements may also include embedded information, such as links, meta-information, and/or machine executable instructions. One or more publishers 106 may submit requests for advertisements to the system 104. Alternatively, the request may come directly from the users 108 upon executing publisher 106—embedded code as instructed by the advertisement system 104. The system 104 responds by sending advertisements (e.g., when an associated publication is rendered) to either the requesting publisher 106 or directly to the user 108 for placement on one or more of the publisher's web properties (e.g., websites and other network-distributed content). While reference is made to advertisements, other content items can be provided by the system 104.

Other entities, such as users 108 and the advertisers 102, as well as the publishers 106 can provide usage information to the system 104, such as, for example, whether a click-through related to an advertisement has occurred, whether a conversion has occurred, or whether some other defined event has occurred. Such usage information can be processed to measure performance metrics, such as click-through rates, conversion rates, etc.

Other usage information and/or performance metrics can also be used. The usage information and/or performance metrics can, for example, be revenue related or non-revenue related. In another implementation, the performance metrics can be parsed according to time, e.g., the performance of a particular content item may be determined to be very high on weekends, moderate on weekday evenings, but very low on weekday mornings and afternoons, for example.

This usage information can include measured or observed user behavior related to advertisements that have been served. The system 104 performs financial transactions, such as crediting the publishers 106 and charging the advertisers 102 based on the usage information.

One example of a publisher 106 is a general content server that receives requests for content (e.g., articles, discussion threads, music, video, graphics, search results, web page listings, information feeds, etc.), and retrieves the requested content in response to the request. The content server may submit a request for advertisements to an advertisement server in the system 104, or embed code in the rendered page for the user 108 to execute and retrieve said ads. The advertisement request may include a number of advertisements desired. The advertisement request may also include content request information. This information can include the content itself (e.g., page or other content document), a pointer to the content by way of a uniform resource locator ("URL"), a category corresponding to the content or the content request (e.g., arts, business, computers, arts-movies, arts-music, etc.), part or all of the content request, content age, content type (e.g., text, graphics, video, audio, mixed media, etc.), geo-location information, etc.

In some implementations, the content server (or a viewer (e.g., browser) associated with a content requestor) can combine the requested content with one or more of the advertisements provided by the system 104. This combined content and advertisements can be sent/presented to the user 108 that requested the content. The content server can transmit information about the advertisements back to the advertisement server, including information describing how, when, and/or where the advertisements are to be rendered (e.g., in HTML or JavaScript™).

Another example publisher 106 is a search service. A search service can receive queries for search results. In response, the search service can retrieve relevant search results from an index of documents (e.g., from an index of web pages). An exemplary search service is described in the article S. Brin and L. Page, "The Anatomy of a Large-Scale Hypertextual Search Engine," Seventh International World Wide Web Conference, Brisbane, Australia and in U.S. Pat. No. 6,285,999, both of which are incorporated herein by reference each in their entirety. Search results can include, for example, lists of web page titles, snippets of text extracted from those web pages, and hypertext links to those web pages, and may be grouped into a predetermined number of (e.g., ten) search results.

The search service can submit a request for advertisements to the system 104. The request may include a number of advertisements desired. This number may depend on the search results, the amount of screen or page space occupied by the search results, the size and shape of the advertisements, etc. In some implementations, the number of desired advertisements will be from one to ten, or from three to five. The request for advertisements may also include the query (as entered or parsed), information based on the query (such as geo-location information, whether the query came from an affiliate and an identifier of such an affiliate), and/or information associated with, or based on, the search results. Such information may include, for example, identifiers related to the search results (e.g., document identifiers or "docIDs"), scores related to the search results (e.g., information retrieval ("IR") scores), snippets of text extracted from identified documents (e.g., web pages), full text of identified documents, feature vectors of identified documents, etc. In some implementations, IR scores can be computed from, for example, dot products of feature vectors corresponding to a query and a document, page rank scores, and/or combinations of IR scores and page rank scores, etc.

The search service can combine the search results with one or more of the advertisements provided by the system 104. This combined information can then be forwarded to the user 108 that requested the content. The search results can be maintained as distinct from the advertisements, so as not to confuse the user between paid advertisements and presumably neutral search results.

Finally, the search service can transmit information about the advertisement and when, where, and/or how the advertisement was to be rendered back to the system 104.

As can be appreciated from the foregoing, the advertising system 104 can serve publishers 106 such as content servers and search services. The system 104 permits serving of advertisements targeted to content (e.g., documents) served by content servers or in response to search queries provided by users. For example, a network or inter-network may include an advertisement server serving targeted advertisements in response to requests from a search service with advertisement spots for sale. Suppose that the inter-network is the World Wide Web. The search service crawls much or all of the content. Some of this content will include advertisement spots (also referred to as "inventory") available. More specifically, one or more content servers may include one or more documents. Documents may include web pages, email, content, embedded information (e.g., embedded media), meta-information and machine executable instructions, and advertisement spots available. The advertisements inserted into advertisement spots in a document can vary each time the document is served or, alternatively, can have a static association with a given document.

In one implementation, the advertisement system 104 may include an auction process to select advertisements for a domain of a content server. Advertisers may be permitted to select, or bid, an amount the advertisers are willing to pay for each click of an advertisement, e.g., a cost-per-click (CPC) amount an advertiser pays when, for example, a user clicks on an advertisement on a domain. In one implementation, the cost-per-click can include a maximum cost-per-click, e.g., the maximum amount the advertiser is willing to pay for each click of an advertisement. For example, advertisers A, B, and C all select, or bid, a maximum cost-per-click of $0.50, $0.75, and $1.00, respectively. The maximum amount advertiser A will pay for a click is $0.50, the maximum amount advertiser B will pay is $0.75, and the maximum amount advertiser C will pay is $1.00.

In one implementation, the advertisement system 104 can provide content items, e.g., advertisements, to a publisher 106 based on input content associated with the publisher 106. The input content, can for example, be content can be associated with the website of the publisher 106. For example, the input content can include terms that can be used to describe the overall content of a publisher 106. The terms can, for example, include actual terms used on the website. The advertisement system 104 can, for example, select advertisements associated with the input content.

In another implementation, the input content can be associated with search terms input by a user 104. For example, the website of the publisher 106 can include functionality to submit queries to a search service. The input content can, for example, include the queries used in the search. The advertisement system 104 can select advertisements for the publisher 106 associated with the queries.

In one implementation, the advertisement system 104 can group the selected advertisements on a landing page that lists the advertisements associated with the website of the publisher 106. The link to the landing page can comprise one or more keywords associated with the advertisements on the landing page. In some implementations, to maximize revenue or a given metric, e.g., click-through rate or a conversion rate, the advertisement system 104 can identify terms to exclude from the keywords used to create the link to the landing page.

Figure 2:
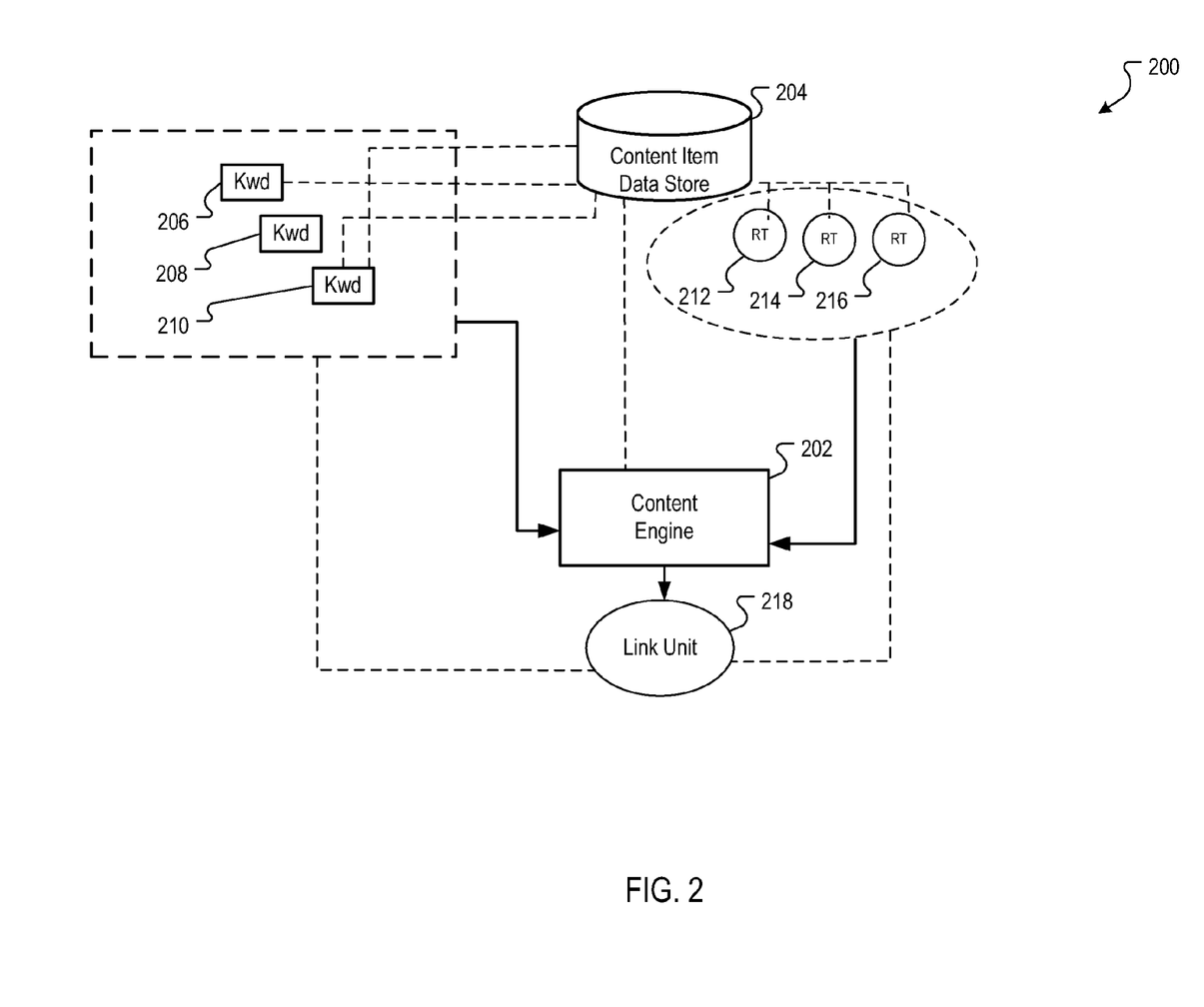
FIG. 2 is a block diagram of an example content selection evaluation system.

FIG. 2 is a block diagram of an example link system 200. The link system 200 can, for example, be implemented in the advertisement system 104 utilizing one or more computing devices that include memory devices storing processing instructions and processing devices for executing the processing instructions. An example computing system is shown and described with reference to FIG. 7. Other implementations, however, can also be used.

In one implementation, the link system 200 can, for example, determine keywords that are used for a link to a landing page that lists advertisements associated with a publisher 106 without using restricted terms in the link. For example, if the restricted terms are "dog" and "cat," the link system 200 determines keywords to use for the link that do not include the terms "dog" and "cat." The restricted terms can, for example, be received from the publisher 106.

The link system 200 can, for example, include a content engine 202 and a content item data store 204. In one implementation, the content item data store 204 can comprise a unitary data store, such as a hard drive. In another implementation, the content data store 204 can comprise a distributed data store, such as a storage system that is distributed over a network.

The content data store 204 can, for example, store one or more advertisements. Each advertisement in the content data store 204 can be associated with one or more performance metrics, e.g., click-through rates, and auction metrics, e.g., cost-per-clicks, etc. In one implementation, the link system 200 can associate a landing page including the advertisements in the content data store 204 with a website of a publisher 106.

In one implementation, the content engine 202 can, for example, identify one or more first content items, such as an advertisement, associated with a second content item, such as a website associated with the publisher 106. In one implementation, the content engine 202 can, parse a website of the publisher 106 and determine content for the website based on the website text. For example, a website with text such as "cat," "cats," "kittens," "feline," "cats as pets," can be determined to have content relating to "cats" generally. The content engine 202 can compare the content of the website with one or more advertisements and determine a set of advertisements that are related to the content of the website. For example, the content engine 202 can compare the website text to one or more advertisements and select for display on the website those advertisements that are related to the website text.

In another implementation, the content engine 202 can receive one or more keywords 206, 208, 210 used in a search query on the website of the publisher 106. The content engine 202 can, for example, compare the keywords 206, 208, 210 with one or more advertisements and determine a set of advertisements that are related to the keywords 206, 208, 210 used in the search query.

In one implementation, the content engine 202 can determine a score for each of the one or more first content items, e.g., advertisements. The score can be based on the relevance of the advertisement to the content of the website or the keywords used in the search query. The content engine 202 can select one or more of the advertisements to associate with the website based on the score of each advertisement. For example, the content engine 202 can select the top highest scoring advertisements as the advertisements to associate with the publisher's website.

In one implementation, the advertisements can each include a relevancy score. The relevancy score can, for example, be based on a semantic relevancy. The relevancy score can measure how closely the advertisement matches the given website or content.

In one implementation, the content engine 202 can identify one or more keywords 206, 208, 210 associated with the first content item, e.g., advertisement. The one or more keywords 206, 208, 210 can, for example, be selected by the advertiser 102 associated with the content item.

The one or more keywords 206, 208, 210 can be used to create a link 218 to a landing page containing the advertisement(s) associated with the keywords 206, 208, 210. The one or more keywords 206, 208, 210 can, for example, each include a relevancy score. The relevancy score can be based on a semantic relevancy between the keyword and the content of the publisher's website. The relevancy score can measure how closely the keywords match the content of the website.

For example, suppose website A consisted of content relating to dogs. The content engine 202 can select one or more advertisements associated with dogs and list the advertisements on a separate landing page. The content engine 202 can select Ad1 relating to dog shampoo and Ad2 relating to leashes as the advertisements associated with dogs. Each of these ads, Ad1 and Ad2, can be associated with one or more keywords selected by the advertiser. For example, Ad1 can be associated with the keywords "animal," "dog," and "shampoo." Ad2 can be associated with the keywords "leash," "neck," and "puppy." Each of the keywords can also be associated with a relevancy score. For example, "animal" may have a relevancy score of 2.3, "dog" may have a relevancy score of 6.2, "shampoo" may have a relevancy score 4.5. The relevancy scores measure how closely related each keyword is to the content of website A.

In one implementation, the content engine 202 can identify restricted terms 212, 214, 216. The restricted terms 212, 214, 216 can be used in determining the link 218. The restricted terms 212, 214, 216 can, for example, include one or more of the keywords 206, 208, 210.

In one implementation, the list of restricted terms 212, 214, 216 can be a list of terms, phrases, or complete sentences. The phrase can, for example, include one or more terms that form a phrase. For example, "cat litter" is a phrase and can be in the list of restricted terms 212, 214, 216. A complete sentence can, for example, include one or more terms that form a sentence. For example, "I want to buy cat litter" is a complete sentence and can be in the list of restricted terms 212, 214, 216.

In one implementation, identifying restricted terms 212, 214, 216 can include receiving the restricted terms from a publisher 106. The publisher 106 can send the restricted terms 212, 214, 216 to the content engine 202 in order for the link system 202 to refrain from using any of the restricted terms as part of the link 218.

In one implementation, identifying the restricted terms 212, 214, 216 can include receiving a category from a publisher 106. The category can, for example, include a vertical category, and the content engine 202 can identify one or more terms associated with the vertical category, which can be included in the restricted terms 212, 214, 216.

For example, suppose the content engine 202 receives a vertical category of "beverages" from the publisher 106. The content engine can identify one or more terms such as "milk," "orange juice," "soda," "water," etc. associated with the vertical category of "beverages." The content engine 202 can include the terms "milk," "orange juice," "soda," and "water," in the restricted terms. Therefore, even if an advertisement is associated with a keyword included in this restricted terms, when the content engine 202 determines the keywords to use as the link 218, the content engine 202 can exclude any of the restricted terms, i.e., "milk," "orange juice," "soda," and "water" from the link 218.

In one implementation, identifying the restricted terms 212, 214, 216 can include receiving an example term from a publisher 106 and identifying one or more terms associated with the example term to be included in the restricted terms 212, 214, 216. The content engine 202 can identify one or more terms that are, for example, semantically close to the example term. A first term can, for example, be semantically close to a second term if the first term pertains to the second term.

For example, suppose a publisher 106 does not want a link 218 to appear on the publisher's website that includes any terms associated with the term "coffee." If the publisher 106 provides the example term "coffee," the content engine 202 can identify the terms "espresso," "Java," "cappuccino," and "latte" because the terms "espresso," "Java," "cappuccino," and "latte" are semantically close to the example term "coffee." Therefore, the terms "espresso," "Java," "cappuccino," and "latte" can be included as the restricted terms 212, 214, 216.

In one implementation, the content engine 202 can select one or more of the keywords 206, 208, 210 associated with the one or more advertisements, as the link 218. The content engine 202 can compare all of the keywords of all of the advertisements and determine one or more of the keywords 206, 208, 210 to use as the link 218.

In one implementation, the content engine 202 can determine which of the keywords 206, 208, 210 to use in the link 218 by evaluating the relevancy scores of each advertisement, the relevancy score of each keyword associated with the advertisement, the cost-per-click amount of each keyword, the conversion rate of each keyword, and the click-through rate of each keyword.

In one implementation, the content engine 202 can first sort the selected advertisements by decreasing relevancy score of the advertisement in order to determine the most relevant advertisements. The content engine 202 can then sort the keywords 206, 208, 210 associated with each advertisement by decreasing relevancy score. Once the keywords 206, 208, 210 are sorted by relevancy score, the content engine 202 can determine a new score for each keyword by factoring in a performance metric associated with each advertisement. For example, the content engine 202 can factor in the cost-per-click amount of each keyword. The content engine 202 can, for example, determine the new score for each keyword by multiplying the relevancy score of each keyword by the cost-per-click of each keyword.

In one implementation, once the new score is calculated for each keyword, the content engine 202 can calculate an adjusted score for each keyword. The adjusted score can, for example, be based on the new score and the relevancy score of the advertisement associated with the keyword. The content engine 202 can calculate the adjusted score of each keyword by multiplying the new score of each keyword by the relevancy score of the advertisement associated with the keyword. The content engine 202 may optionally choose to ignore the relevancy score of the advertisement associated with the keyword and subsequently not calculate an adjusted score in cases where it is determined that using just the keyword relevancy score along with other factors such as cost-per-click and conversion scores yield superior performance to incorporating the relevancy score of the advertisement.

In one implementation, the content engine 202 can re-sort the keywords 206, 208, 210 based on the adjusted scores. For example, the content engine 202 can re-sort the keywords 206, 208, 210 in decreasing order of adjusted scores. In one implementation, the content engine 202 can select one or more of the top ranking keywords as the link 218. The content engine 202 can use any number of keywords in the link 218.

In one implementation, the content engine 202 can select one or more of the top ranking keywords 206, 208, 210 as a potential link. In one implementation, the content engine 202 can compare the terms in the restricted terms 212, 214, 216 with the keywords 206, 208, 210 selected as the potential link to determine whether any of the restricted terms are included the potential link. In one implementation, the content engine 202 can remove any of the restricted terms from the potential link. Once the restricted terms have been removed from the potential link, the content engine 202 can, for example, associate the potential link with the second content item, i.e., website of the publisher 106, as a link 218.

For example, suppose the content engine 202 selected advertisements A and B for a given webpage. The content engine 202 can determine the relevancy score for advertisements A and B.

Advertisement A, for example, has a relevancy score: 6.125. The keywords associated with advertisement A are:
    cars with a relevancy score: 1.954 and a CPC: $0.25
    autos with a relevancy score: 5.241 and a CPC: $0.10
    vehicles with a relevancy score: 2.187 and a CPC: $2.35

Advertisement B has a relevancy score: 9.654. The keywords for advertisement B are:
    tires with a relevancy score: 1.117 and a CPC: $1.99
    brakes with a relevancy score: 7.883 and a CPC: $0.20
    rims with a relevancy score: 0.119 and a CPC: $0.15

The content engine 202 can first sort the advertisements by decreasing relevancy score. Therefore, in this example, advertisement B is listed first followed by advertisement A because advertisement B has a relevancy score of 9.654, which is higher than the relevancy score of advertisement A, which is 6.125.

The content engine 202 can sort the keywords associated with each advertisement based on decreasing relevancy. In this example, the keywords associated with Advertisement B can be sorted as follows:
    brakes score: 7.883 CPC: $0.20
    tires score: 1.117 CPC: $1.99
    rims score: 0.119 CPC: $0.15

The keywords associated with advertisement A can be sorted as follows:
    autos score: 5.241 CPC: $0.10
    vehicles score: 2.187 CPC: $2.35
    cars score: 1.954 CPC: $0.25

The content engine 202 can re-sort the keywords by factoring in a performance metric associated with each keyword. For example, the content engine 202 can factor the CPC into the relevancy scores. The content engine 202 can, for example, multiply the relevancy score by the CPC to determine a new score, i.e., new_score=score*CPC.

For advertisement B, the new score of each keyword can be calculated as follows:
    brakes new_score: 7.883*0.20=1.57
    tires new_score: 1.117*1.99=2.48
    rims new_score: 0.119*0.15=0.018

For advertisement A, the new score of each keyword can be calculated as follows:
    autos new_score: 5.241*0.10=0.52
    vehicles new_score: 2.187*2.35=5.14
    cars new_score: 1.954*0.25=0.49

The content engine 202 can calculate an adjusted score for each keyword and the top scoring keywords can be selected as the keywords to be used in the link 218. The adjusted score can, for example, be calculated by multiplying the new score by the advertisement relevancy score. Therefore, the keyword adjusted_score=new_score*advertisement relevancy score. For the advertisement A keywords, the adjusted scores can be calculated as follows:
    tires 2.48*9.654=23.94
    brakes 1.57*9.654=15.16
    rims 0.018*9.654=0.17

For the advertisement B keywords, the adjusted scores can be calculated as follows:
    vehicles 5.14*6.125=31.48
    autos 0.52*6.125=3.19
    cars 0.49*6.125=3.00

The content engine 202 can re-sort the keywords in decreasing order based on the adjusted scores. Therefore, the keywords can be sorted as follows:

1. Vehicles: adjusted score 31.48
2. Tires: adjusted score 23.94
3. Brakes: adjusted score 15.16
4. Autos: adjusted score 3.19
5. Cars: adjusted score 3.00
6. Rims: adjusted score 0.17

The content engine 202 can select any of the top ranking keywords as the link 218. For example, the content engine 202 can select "vehicle tires" as the link 218. The link 218 can include a link to a landing page that lists advertisements A and B.

Suppose the content engine 202 receives a vertical category of "exterior car parts" from the publisher 106. The vertical category may be a restricted category. The content engine 202 can, for example, identify the terms "tires," "wheel," "headlights," "rims," and "bumper." The content engine 202 can include the terms "tires," "wheel," "brakes," "headlights," "rims," and "bumper" as the restricted terms 212, 214, 216. Therefore, after the link 218 is determined, the content engine 202 can determine whether any of the terms in the restricted terms 212, 214, 216 are in the link 218. In this example, initially the term "tires" was going to be included in the link 218. However, the content engine 202 can remove the term "tires" from the link 218.

In one implementation, the content engine 202 can select another keyword form the keywords 206, 208, 210 based on the adjusted scores for the link 218. Therefore, since "tires" cannot be included in the link 218, the content engine 202 can, for example, determine whether the next ranked keyword can be included in the link 218. The next ranked keyword is "brakes." The keyword "brakes" is also one of the restricted terms 212, 214, 216 and therefore, cannot be used in the link 218. The content engine 202 can again determine whether the next ranked keyword can be included in the link 218. The next ranked keyword is "autos," and "autos" is not one of the restricted terms 212, 214, 216. Therefore, the content engine 202 can use the keyword "autos" in the link 218.

Figure 3:
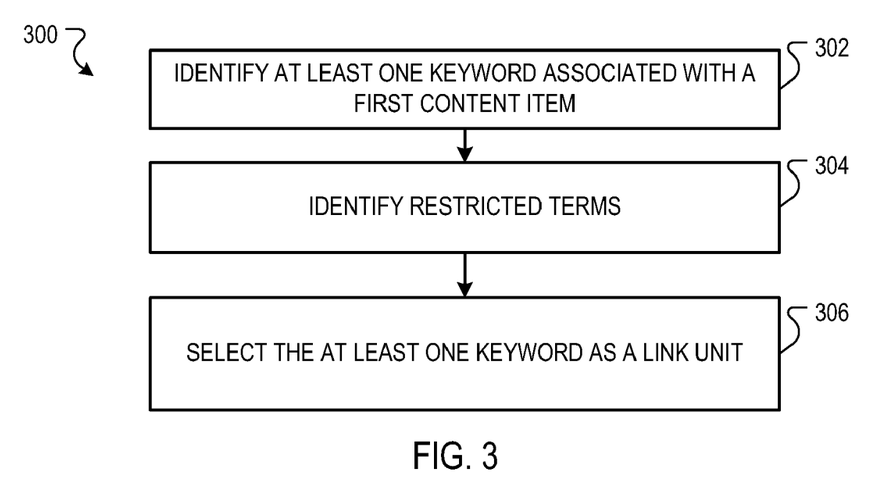
FIG. 3 is a flow diagram of an example process for filtering link keywords.

FIG. 3 is a flow diagram of an example process 300 for filtering link keywords. The process 300 can, for example, be implemented in a system such as the link keyword system 200 of FIG. 2. Stage 302 identifies at least one keyword associated with a first content item. For example, the content engine 202 can identify at least one keyword associated with a first content item. Stage 304 identifies restricted terms. For example, the content engine 202 can identify restricted terms. Stage 306 selects the at least one keyword as a link, wherein the link does not contain restricted terms. For example, the content engine 202 can select the at least one keyword as a link, wherein the link does not contain the restricted terms.

Figure 4:
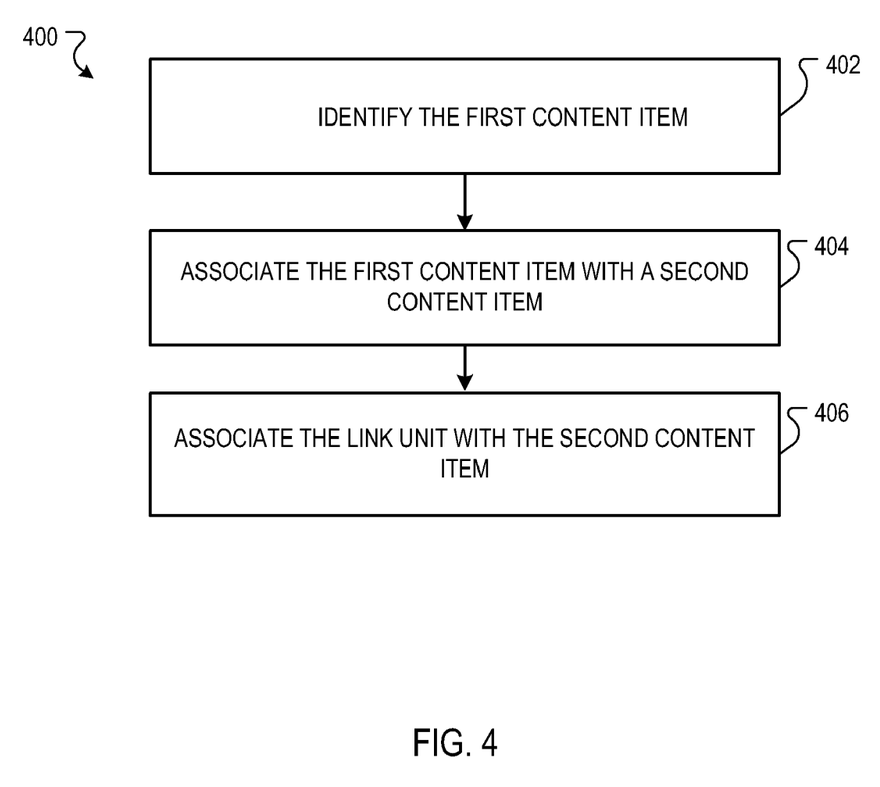
FIG. 4 is an example process for associating a link with a content item.

FIG. 4 is an example process 400 for associating a link with a content item. The process 300 can, for example, be implemented in a system such as the link keyword system 200 of FIG. 2. Stage 402 identifies a first content item. For example, the content engine 202 can identify a first content item. Stage 404 associates the first content item with a second content item. For example, the content engine 202 can associate first content item with a second content item. Stage 406 associates the link with the second content item. For example, the content engine 202 can associate the link with the second content item.

Figure 5:
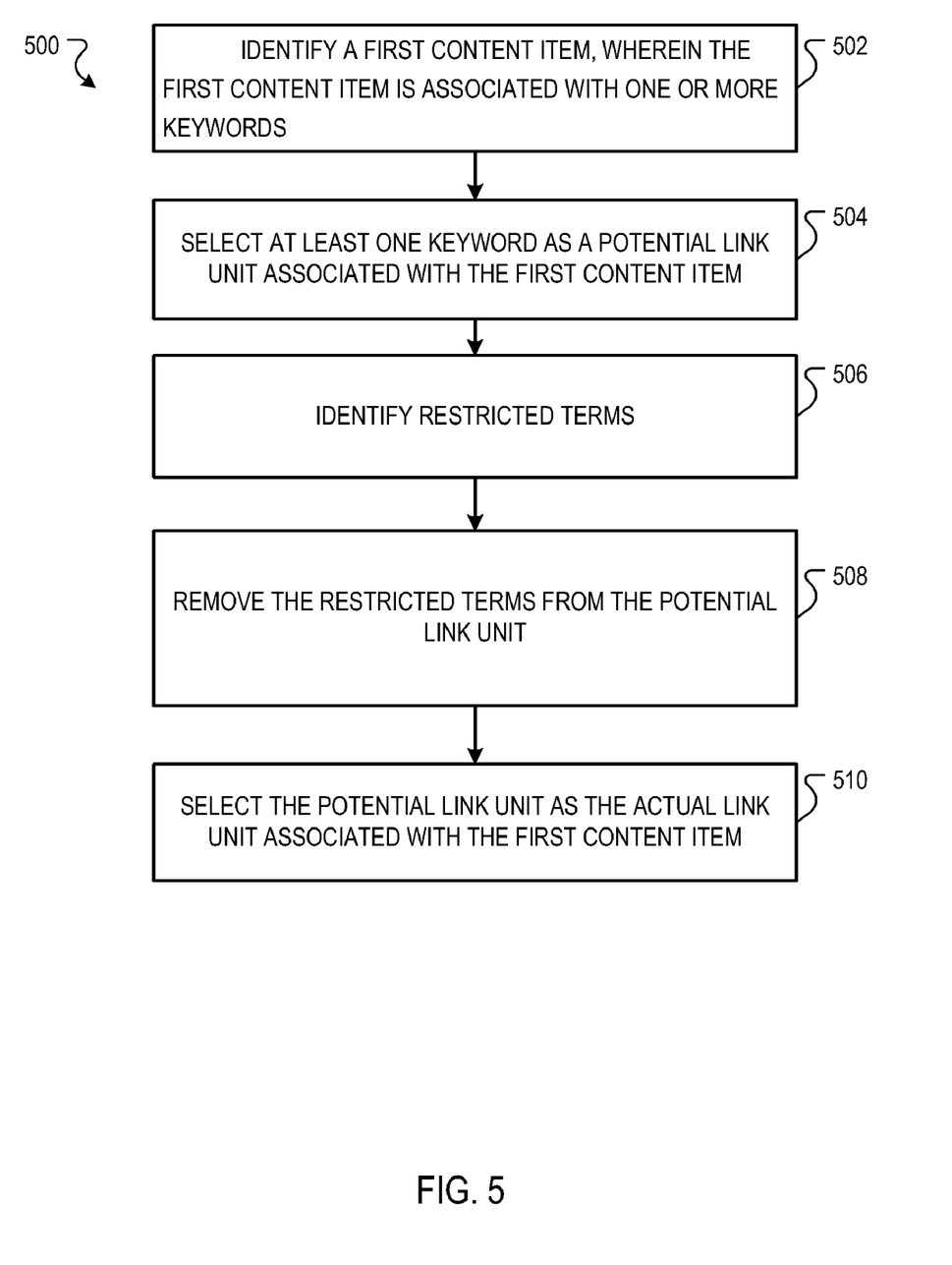
FIG. 5 is another flow diagram of an example process for filtering link keywords.

FIG. 5 is another flow diagram of an example process 500 for filtering link keywords. The process 500 can, for example, be implemented in a system such as the link keyword system 200 of FIG. 2. Stage 502 identifies a first content item, wherein the first content item is associated with at least one keyword. For example, the content engine 202 can identify a first content item, wherein the first content item is associated with at least one keyword. Stage 504 selects the at least one keyword as a potential link associated with the first content item. For example, the content engine 202 can select the at least one keyword as a potential link associated with the first content item. Stage 506 identifies restricted terms. For example, the content engine 202 can identify restricted terms. Stage 508 removes the restricted terms from the potential link. For example, the content engine 202 can remove restricted terms from the potential link. Stage 510 selects the potential link as the actual link associated with the first content item. For example, the content engine 202 can select the potential link as the actual link associated with the first content item.

Figure 6:
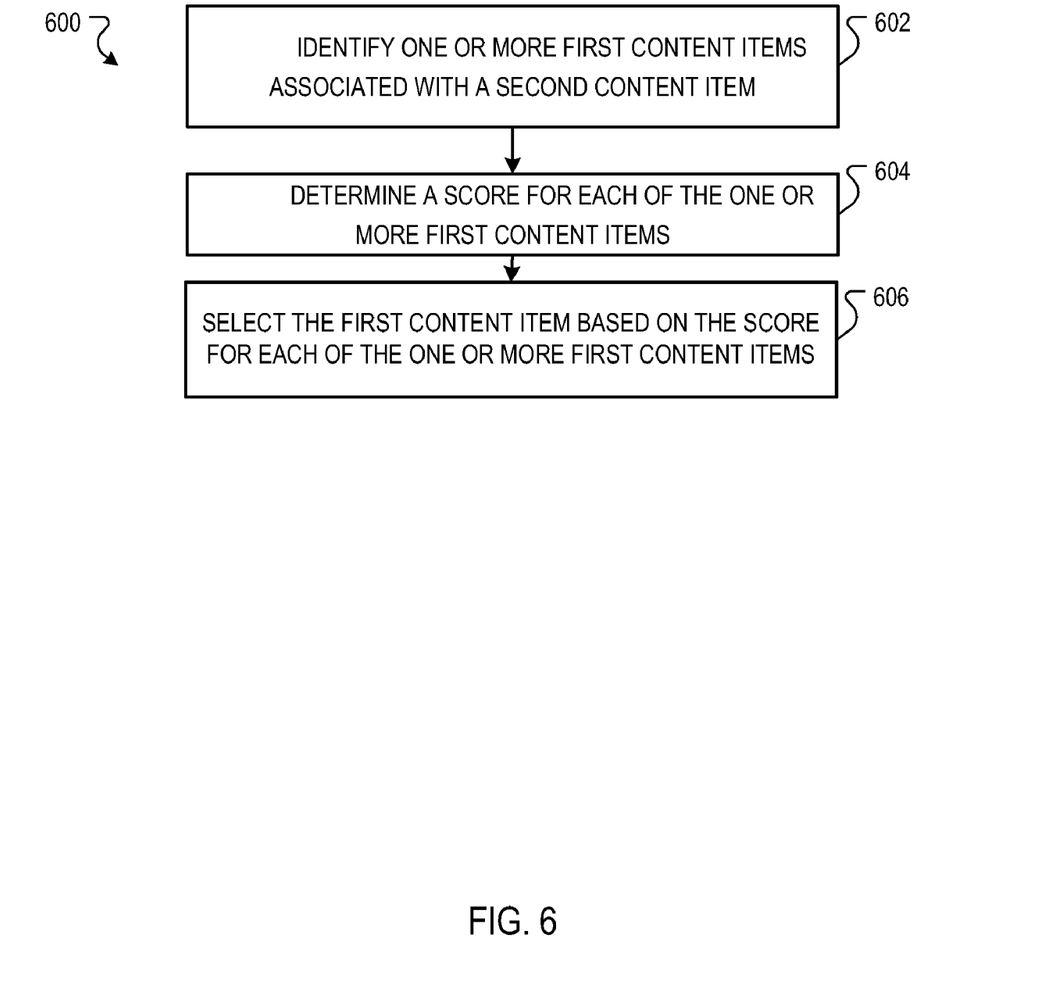
FIG. 6 is a flow diagram of an example process for identifying a content item.

FIG. 6 is an example process 600 for identifying a content item. The process 300 can, for example, be implemented in a system such as the link keyword system 200 of FIG. 2. Stage 602 identifies one or more first content items associated with a second content item. For example, the content engine 202 can identify one or more first content items associated with a second content item. Stage 604 determines a score for each of the one or more first content items. For example, the content engine 202 can determine a score for each of the one or more first content items. Stage 606 selects the first content item based on the score for each of the one or more first content items. For example, the content engine 202 can select the first content item based on the score for each of the one or more first content items.

Figure 7:
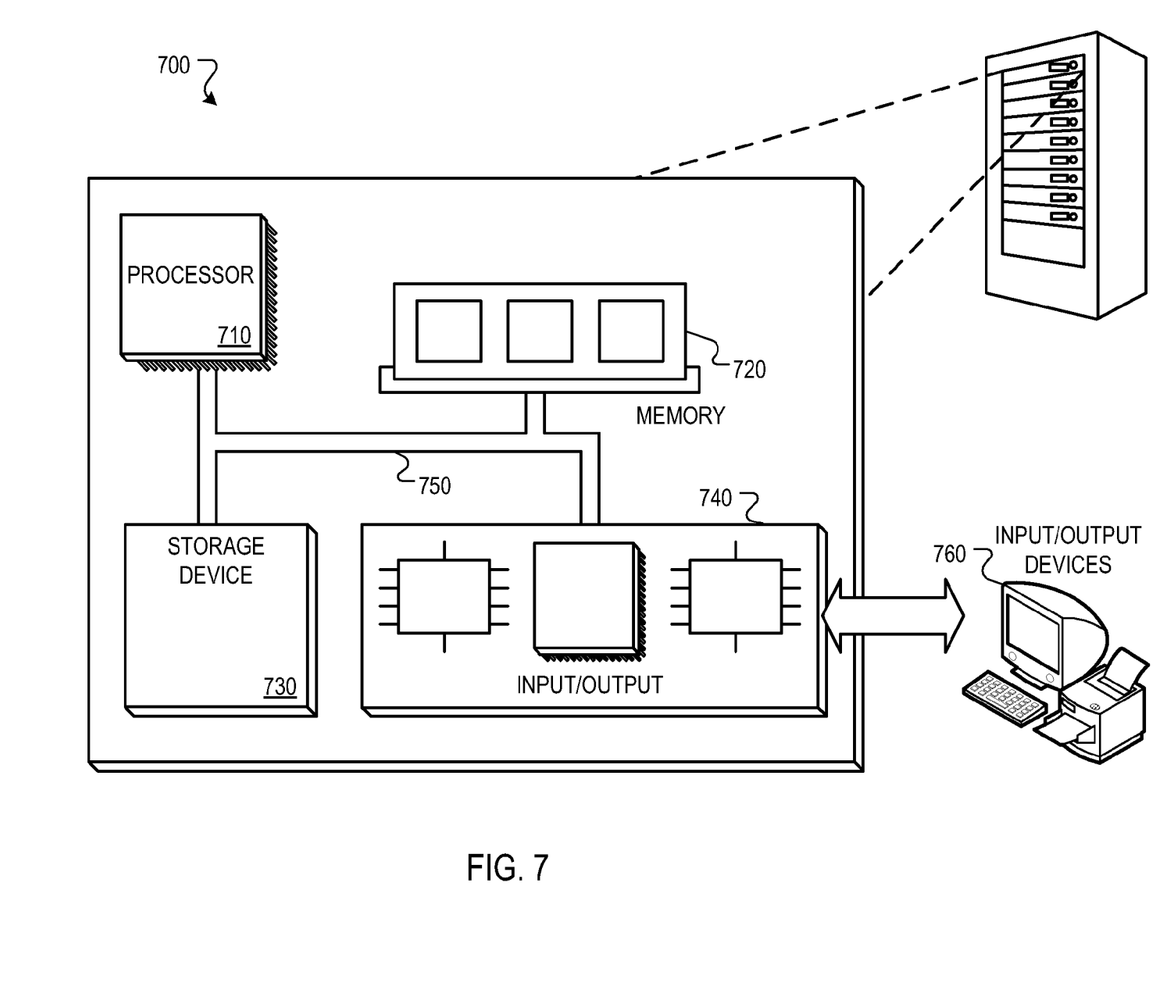
FIG. 7 is a schematic diagram of an example computer system that can be utilized to implement the systems and methods described herein.

FIG. 7 is block diagram of an example computer system 700. The system 700 includes a processor 710, a memory 720, a storage device 730, and an input/output device 740. Each of the components 710, 720, 730, and 740 can, for example, be interconnected using a system bus 750. The processor 710 is capable of processing instructions for execution within the system 700. In one implementation, the processor 710 is a single-threaded processor. In another implementation, the processor 710 is a multi-threaded processor. The processor 710 is capable of processing instructions stored in the memory 720 or on the storage device 730.

The memory 720 stores information within the system 700. In one implementation, the memory 720 is a computer-readable medium. In one implementation, the memory 720 is a volatile memory unit. In another implementation, the memory 720 is a non-volatile memory unit.

The storage device 730 is capable of providing mass storage for the system 700. In one implementation, the storage device 730 is a computer-readable medium. In various different implementations, the storage device 730 can, for example, include a hard disk device, an optical disk device, or some other large capacity storage device.

The input/output device 740 provides input/output operations for the system 700. In one implementation, the input/output device 740 can include one or more of a network interface devices, e.g., an Ethernet card, a serial communication device, e.g., and RS-232 port, and/or a wireless interface device, e.g., and 802.11 card. In another implementation, the input/output device can include driver devices configured to receive input data and send output data to other input/output devices, e.g., keyboard, printer and display devices 760. Other implementations, however, can also be used, such as mobile computing devices, mobile communication devices, set-top box television client devices, etc.

Although the above description refers to a content item such as an advertisement, content items such as video and/or audio files, web pages for particular subjects, news articles, etc. can also be used. For example, the content item can be a video advertisement on a website.

The apparatus, methods, flow diagrams, and structure block diagrams described in this patent document may be implemented in computer processing systems including program code comprising program instructions that are executable by the computer processing system. Other implementations may also be used. Additionally, the flow diagrams and structure block diagrams described in this patent document, which describe particular methods and/or corresponding acts in support of steps and corresponding functions in support of disclosed structural means, may also be utilized to implement corresponding software structures and algorithms, and equivalents thereof.

This written description sets forth the best mode of the invention and provides examples to describe the invention and to enable a person of ordinary skill in the art to make and use the invention. This written description does not limit the invention to the precise terms set forth. Thus, while the invention has been described in detail with reference to the examples set forth above, those of ordinary skill in the art may effect alterations, modifications and variations to the examples without departing from the scope of the invention.

What is claimed is:

1. A computer-implemented method, comprising:
   determining a score for each of one or more keywords, the one or more keywords being designated by an advertiser associated with an advertisement;
   ranking the one or more keywords by score;
   selecting one or more highest-ranked keywords to be published as the advertisement, wherein each keyword has an associated link to a landing page that includes advertisements related to the keyword;
   identifying one or more restricted terms including:
      receiving a category from a publisher of a webpage that is to present the advertisement; and
      identifying one or more terms associated with the category to be included as the one or more restricted terms;
   determining that a particular keyword of the one or more selected keywords matches an identified restricted term;
   replacing the matched keyword with a next highest-ranked keyword that was not selected to be published and that was not identified as a restricted term; and
   providing the advertisement including providing each keyword of the advertisement and associated link to a respective landing page.

2. The method of claim 1, wherein the category comprises a vertical category.

3. The method of claim 1, wherein identifying the restricted terms comprises:
   receiving an example term from the publisher; and
   identifying one or more terms associated with the example term to be the restricted terms.

4. The method of claim 1, wherein the determined score for a keyword is based at least in part on content of the webpage.

5. The method of claim 1, further comprising:
   identifying one or more advertisements associated with the webpage; and
   determining a score for each of the one or more advertisements, wherein providing the advertisement includes selecting an advertisement based on the determined score of each of the one or more advertisements.

6. A computer-implemented method, comprising:
   determining a score for each of one or more keywords, the one or more keywords being designated by an advertiser associated with an advertisement;
   ranking the one or more keywords by score;
   selecting one or more highest-ranked keywords to be published as the advertisement, wherein each of the one or more keywords is associated with a link to a landing page that includes one or more advertisements related to a given keyword;
   receiving one or more restricted terms from a publisher of a webpage that is to present the advertisement;
   determining that a particular keyword of the one or more selected keywords matches a received restricted term;
   replacing the matched keyword with a next highest-ranked keyword that was not selected to be published and that was not identified as a restricted term; and
   providing the advertisement including providing each keyword or alternate keyword and associated link to a respective landing page.

7. The method of claim 6, further comprising:
   identifying one or more advertisement associated with the webpage;
   determining a score for each of the one or more advertisements, wherein providing the advertisement includes selecting an advertisement based on the determined score of each of the one or more advertisements.

8. A system, comprising:
   one or more computers; and
   a computer-readable medium coupled to the one or more computers having instructions stored thereon which, when executed by the one or more computers, cause the one or more computers to perform operations comprising:
      determining a score for each of one or more keywords, the one or more keywords being designated by an advertiser associated with an advertisement;
      ranking the one or more keywords by score;
      selecting one or more highest-ranked keywords to be published as the advertisement, wherein each keyword has an associated link to a landing page that includes advertisements related to the keyword;
      identifying one or more restricted terms including:
         receiving a category from a publisher of a webpage that is to present the advertisement; and
         identifying one or more terms associated with the category to be included as the one or more restricted terms;
      determining that a particular keyword of the one or more selected keywords matches an identified restricted term;
      replacing the matched keyword with a next highest-ranked keyword that was not selected to be published and that was not identified as a restricted term; and
      providing the advertisement including providing each keyword of the advertisement and associated link to a respective landing page.

9. The system of claim 8, wherein the operations further comprise:
   receiving the restricted terms from a publisher.

10. The system of claim 8, wherein the category comprises a vertical category.

11. A computer-readable storage device encoded with a computer program, the program comprising instructions that when executed by data processing apparatus cause the data processing apparatus to perform operations, comprising:
    determining a score for each of one or more keywords, the one or more keywords being designated by an advertiser associated with an advertisement;
    ranking the one or more keywords by score;

selecting one or more highest-ranked keywords to be published as the advertisement, wherein each keyword has an associated link to a landing page that includes advertisements related to the keyword;

identifying one or more restricted terms including:
   receiving a category from a publisher of a webpage that is to present the advertisement; and
   identifying one or more terms associated with the category to be included as the one or more restricted terms;

determining that a particular keyword of the one or more selected keywords matches an identified restricted term;

replacing the matched keyword with a next highest-ranked keyword that was not selected to be published and that was not identified as a restricted term; and providing the advertisement including providing each keyword of the advertisement and associated link to a respective landing page.

12. A computer-implemented method, comprising:

determining a score for each of one or more keywords, the one or more keywords being designated by an advertiser associated with an advertisement;

ranking the one or more keywords by score;

selecting one or more highest-ranked keywords to be published as the advertisement, each keyword has an associated link to a landing page that includes advertisements related to the keyword;

identifying one or more restricted terms including:
   receiving an example term from a publisher of a webpage that is to present the advertisement, and
   identifying one or more terms associated with the example term to be included as the one or more restricted terms;

determining whether any of the one or more keywords match any of the identified restricted terms;

replacing each matched keyword with a next highest-ranked keyword that was not selected to be published and that was not identified as a restricted term; and providing the advertisement including providing each keyword of the advertisement and associated link to a respective landing page.

13. The method of claim 1, wherein the score for a keyword is based at least in part on a semantic relevance between the keyword and content of the publisher's webpage.

14. The method of claim 1, wherein the score for a keyword is based at least in part on a performance metric associated with the keyword.

15. The method of claim 6, wherein the score for a keyword is based at least in part on a semantic relevance between the keyword and content of the publisher's webpage.

16. The method of claim 6, wherein the score for a keyword is based at least in part on a performance metric associated with the keyword.

17. The system of claim 8, wherein the score for a keyword is based at least in part on a semantic relevance between the keyword and content of the publisher's webpage.

18. The system of claim 8, wherein the score for a keyword is based at least in part on a performance metric associated with the keyword.

19. The computer-readable of claim 11, wherein the score for a keyword is based at least in part on a semantic relevance between the keyword and content of the publisher's webpage.

20. The computer-readable storage device of claim 11, wherein the score for a keyword is based at least in part on a performance metric associated with the keyword.

21. The method of claim 12, wherein the score for a keyword is based at least in part on a semantic relevance between the keyword and content of the publisher's webpage.

22. The method of claim 12, wherein the score for a keyword is based at least in part on a performance metric associated with the keyword.

* * * * *

UNITED STATES PATENT AND TRADEMARK OFFICE
CERTIFICATE OF CORRECTION

PATENT NO.        : 8,166,046 B1
APPLICATION NO.   : 11/853595
DATED             : April 24, 2012
INVENTOR(S)       : Jerry P. Krikheli, Shuman Ghosemajumder and Jeffery K. Eddings Page 1 of 1

It is certified that error appears in the above-identified patent and that said Letters Patent is hereby corrected as shown below:

Column 13, Line 24, at Claim 12; replace:
"lished as the advertisement, each keyword has an associated" with
-- lished as the advertisement, wherein each keyword has an associated --

Signed and Sealed this
Nineteenth Day of June, 2012

David J. Kappos
*Director of the United States Patent and Trademark Office*